United States Patent
Simmons, Jr. et al.

(10) Patent No.: US 7,538,790 B2
(45) Date of Patent: May 26, 2009

(54) METHOD AND APPARATUS FOR CONTROLLING A VIDEO SIGNAL PROCESSING APPARATUS TO PREVENT SCREEN AGING

(75) Inventors: Carlton Jethro Simmons, Jr., Indianapolis, IN (US); Richard Allen Zemer, Noblesville, IN (US); Mark Gilmore Mears, Zionsville, IN (US); Chad Andrew Lefevre, Indianapolis, IN (US); Aaron Hal Dinwiddie, Cicero, IN (US)

(73) Assignee: Thomson Licensing, Boulogne Billancourt (FR)

( * ) Notice: Subject to any disclaimer, the term of this patent is extended or adjusted under 35 U.S.C. 154(b) by 625 days.

(21) Appl. No.: 10/512,327

(22) PCT Filed: Apr. 21, 2003

(86) PCT No.: PCT/US03/12180

§ 371 (c)(1),
(2), (4) Date: Aug. 11, 2005

(87) PCT Pub. No.: WO03/090455

PCT Pub. Date: Oct. 30, 2003

(65) Prior Publication Data

US 2006/0130105 A1     Jun. 15, 2006

Related U.S. Application Data

(60) Provisional application No. 60/374,885, filed on Apr. 23, 2002, provisional application No. 60/374,406, filed on Apr. 22, 2002.

(51) Int. Cl.
*H04N 3/20* (2006.01)
*H04N 5/57* (2006.01)

(52) U.S. Cl. ..................................... 348/173; 348/687
(58) Field of Classification Search ................. 348/173, 348/377, 378, 189, 687, 745; 715/867; 345/589
See application file for complete search history.

(56) References Cited

U.S. PATENT DOCUMENTS 5,796,945 A * 8/1998 Tarabella .................... 709/219

(Continued)

FOREIGN PATENT DOCUMENTS

EP      0749081       12/1996

(Continued)

OTHER PUBLICATIONS

Search Report Dated Aug. 26, 2003.

*Primary Examiner*—Victor R. Kostak
(74) *Attorney, Agent, or Firm*—Robert D. Shedd; Paul P. Kiel

(57) ABSTRACT

An apparatus and method for controlling a video signal processing apparatus having a browser feature to protect a display device associated with the apparatus against the premature aging effects of screen burn due to an idle display when the browser feature is activated. The method includes the steps of detecting a first user input to a video apparatus, determining whether the first user input activates a browser feature of the video apparatus, and controlling the operation of the apparatus to reduce the screen burn. The operation can include setting a display parameter for the video apparatus to a first predetermined level responsive to determining that the first user input activates the browser feature, or determining an idle time and inactivating the browser feature if the idle time exceeds a predetermined period of time.

19 Claims, 3 Drawing Sheets

U.S. PATENT DOCUMENTS

| | | | | |
|---|---|---|---|---|
| 5,980,264 | A | * | 11/1999 | Lundberg .................... 434/322 |
| 5,996,007 | A | * | 11/1999 | Klug et al. .................. 709/218 |
| 6,008,836 | A | * | 12/1999 | Bruck et al. ................. 725/131 |
| 6,034,652 | A | * | 3/2000 | Freiberger et al. .......... 715/730 |
| 6,097,383 | A | | 8/2000 | Gaughan et al. |
| 6,516,421 | B1 | * | 2/2003 | Peters ........................ 713/502 |
| 7,178,111 | B2 | * | 2/2007 | Glein et al. ................. 715/848 |
| 2002/0026637 | A1 | * | 2/2002 | Markel et al. ................ 725/37 |
| 2002/0075321 | A1 | * | 6/2002 | Sakatani .................... 345/814 |
| 2003/0169306 | A1 | * | 9/2003 | Makipaa et al. ............. 345/864 |
| 2003/0229900 | A1 | * | 12/2003 | Reisman ..................... 725/87 |
| 2004/0049533 | A1 | * | 3/2004 | Knight ....................... 709/203 |
| 2005/0240961 | A1 | * | 10/2005 | Jerding et al. ................ 725/37 |

FOREIGN PATENT DOCUMENTS

| | | |
|---|---|---|
| EP | 0896318 | 2/1999 |
| EP | 1085757 | 3/2001 |
| WO | WO 99/34593 | 7/1999 |

\* cited by examiner

METHOD AND APPARATUS FOR CONTROLLING A VIDEO SIGNAL PROCESSING APPARATUS TO PREVENT SCREEN AGING

This application claims the benefit, under 35 U.S.C. § 365 of International Application PCT/US03/12180, filed Apr. 21, 2003, which was published in accordance with PCT Article 21(2) on Oct. 30, 2003 in English and which claims the benefit of U.S. Provisional Patent Application No. 60/374,885, filed Apr. 23, 2002 and U.S. Provisional Patent Application No. 60/374,406, filed Apr. 22 2002.

BACKGROUND OF THE INVENTION

The present invention generally relates to video apparatuses and a method for controlling video apparatuses, and more particularly, for controlling the operation of the video apparatus having a browser feature included therein to protect an associated display device against the premature aging effects of screen burn.

BRIEF SUMMARY OF THE INVENTION

With typical display screens utilizing one or more cathode ray tubes (CRTs) to provide a visual display, an unchanging image on the screen will tend to burn that image into the screen. In particular, a condition known as "screen burn" occurs when the phosphors on the internal surface of a CRT screen deteriorate over time due to the frequent presence of high-intensity beams necessary for creating an image. Those areas of the screen that continually receive more images will experience more screen burn than those areas of the screen that continually receive fewer images. Eventually, a noticeable difference may exist between different areas of the screen due to the accumulation of screen burn. In some cases, the burned-in screen image is very noticeable.

Video apparatuses such as television signal receivers typically provide video displays that are constantly changing over time, thereby reducing the chances of premature screen burn. However, with the inclusion of features such as an Internet browser into such apparatuses, display devices may be required to display images that have very little, if any, motion. As a result, the risk of screen burn increases. Accordingly, there is a need for a technique for preventing premature aging from screen burn in video apparatuses having a browser feature.

In accordance with an aspect of the present invention, a method for preventing screen aging is disclosed. According to an exemplary embodiment, the method comprises steps of detecting a first user input to a video apparatus, determining whether the first user input activates a browser feature of the video apparatus, and setting a display parameter for the video apparatus to a first predetermined level responsive to determining that the first user input activates the browser feature.

In accordance with another aspect of the present invention, a video apparatus for preventing screen aging is disclosed. According to an exemplary embodiment, the video apparatus comprises means for detecting a first user input to the video apparatus. Processing means determines whether the first user input activates a browser feature of the video apparatus. Deflection means sets a display parameter for the video apparatus to a first predetermined level responsive to the processing means determining that the first user input activates the browser feature.

Another aspect of the present invention is a method for mitigating screen burn or screen aging effects of the browser is to specify an "Idle timeout" such that if the user does not interact with the browser for a specified period, the browser will present a dialog warning box to the user informing him/her that if a browser command is not received in a short time period (30 seconds) the browser will automatically close and return the user to the program, or TV, viewing. After the specified time interval, the browser will terminate, close, and return the user to 'normal' (non-browser) TV viewing. The specification of "browser command" indicates that channel changes, volume changes, and "TV viewing" commands are different and distinct from browser commands. The method of entry into the browser dictates the "idle timeout" value. To wit: invocation of the browser from the menu will use a shorter timeout than via the keyboard command to invoke the browser.

As used herein, the term video apparatus includes any apparatus for processing video signals and providing output signals suitable for display on a display device, which may be externally attached or formed integrally with the apparatus, for example, a television receiver using cathode ray tubes and projection televisions including high definition television displays. The invention is especially useful in high definition apparatus, projection televisions, which are subject to such screen burn due to static images being displayed, and plasma displays. Although the exact amount of screen burn varies between different types and models of television displays and depends on the length of time a static image is displayed on the screen, and also varies according to user settings such as brightness and contrast, in general the high definition projection television type is the most prone to this problem.

The above-mentioned and other features and advantages of this invention, and the manner of attaining them, will become more apparent and the invention will be better understood by reference to the following description of embodiments of the invention taken in conjunction with the accompanying drawings, wherein:

The exemplifications set out herein illustrate preferred embodiments of the invention, and such exemplifications are not to be construed as limiting the scope of the invention in any manner.

DETAILED DESCRIPTION OF THE INVENTION

Figure 1:
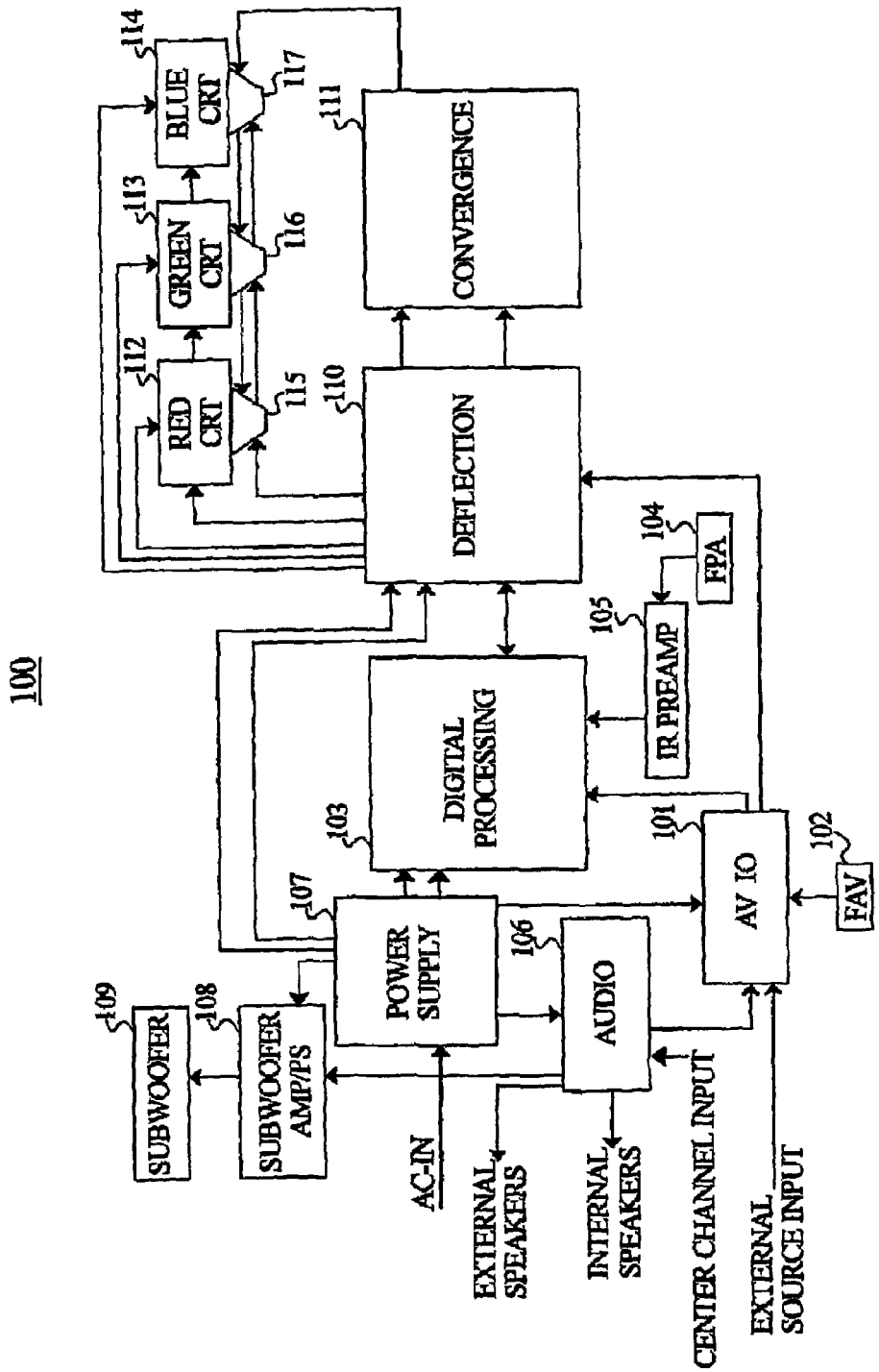
FIG. 1 is an exemplary apparatus suitable for implementing the present invention.

Referring now to the drawings, and more particularly to FIG. 1, an exemplary apparatus 100 suitable for implementing the present invention is shown. For purposes of example and explanation, apparatus 100 represents an exemplary portion of a television signal receiver embodied as a projection screen television. However, it will be intuitive to those skilled in the art that principles of the present invention may be applied to other apparatuses.

As shown in FIG. 1, apparatus 100 comprises an audio/video input/output (AV IO) block 101, a front audio/video (FAV) connector 102, a digital processing block 103, a front panel assembly (FPA) 104, an infrared (IR) preamp 105, an audio block 106, a power supply 107, a subwoofer amp/ power supply 108, a subwoofer 109, a deflection block 110, a convergence block 111, CRTs 112 to 114, and yokes 115 to 117. The foregoing elements of FIG. 1 are operatively coupled as indicated by the data lines shown in FIG. 1. As will be intuitive to those skilled in the art, many of the elements represented in FIG. 1 may be embodied using integrated circuits (ICs).

AV IO block 101 is operative to receive and process audio and/or video inputs, and to output processed audio and/or video signals to other elements of apparatus 100, as indicated in FIG. 1. According to an exemplary embodiment, AV IO block 101 receives audio and/or video inputs from an external source (e.g., via satellite, terrestrial, cable, internet, etc.) and also receives processed audio inputs from audio block 106. According to this exemplary embodiment, AV IO block 101 processes these inputs and outputs composite video signals and all audio signals to digital processing block 103 for additional processing, while outputting component video signals (e.g., 2H, 2.14H, Y, Pr, Pb video information) to deflection block 110. FAV connector 102 is operative to provide audio and/or video inputs to AV IO block 101.

Digital processing block 103 is operative to perform various digital functions of apparatus 100, such as tuning, demodulation, signal decompression, memory and other functions. Although digital processing block 103 is illustratively shown as a single digital data processing block, it is well known that the functions performed within digital processing block 103 may be implemented using a plurality of well known IC blocks or units, including separate ICs for encoder/decoder, central processing or control, video signal processing, A/D conversion, D/A conversion, switching between auxiliary and main images for generating PIP images, etc. The techniques and methods for generating the various user-activated display functions, such as zoom, and various aspect ratio pictures, are well known to those skilled in the art and any such techniques and methods may be used in implementing the user-activated display function of the present invention. Also, digital processing block 103 may include sufficient memory to carry out certain functions, and be able to access and control external RAM and ROM (not shown) for carrying out the required video and data processing operations. As will be explained later herein, digital processing block 103 is also operative to enable a browser feature of apparatus 100, and to enable a display parameter control function in response to detecting the activation and/or de-activation of the browser feature. As used herein, the "browser feature" of apparatus 100 refers to a feature, which enables users to access a network, such as the Internet.

FPA 104 includes an interface operative to receive user inputs. The user inputs may be received via known communications links in response to user operation of a remote control device, such as an IR hand-held remote control, a RF remote control device, a wireless keyboard, a wired remote control device, or other similar device. Upon receipt of the user input signals, FPA 104 provides the corresponding decoded control output signals to preamp 105. Preamp 105 is operative to amplify the signals received from FPA 104 and provide the output to digital processing block 103. Digital processing block 103, which may incorporate central processing unit functions as noted above, receives the decoded control signals and performs various operations and controls apparatus 100 in response to the signals.

Audio block 106 is operative to perform various audio-processing functions, and to output processed audio signals. According to an exemplary embodiment, audio block 106 receives a center channel input signal and processes the same to generate audio output signals. As indicated in FIG. 1, audio block 106 is operative to provide audio output signals to both external and internal speakers of apparatus 100. Additionally, audio block 106 provides audio output signals to AV IO block 106, and also provides subwoofer audio signals to subwoofer amp/power supply 108.

Power supply 107 is operative to receive an input alternating current power signal (AC-IN), and to output voltage signals which power the various elements of apparatus 100, as indicated in FIG. 1. According to an exemplary embodiment, power supply 107 provides such voltage signals to AV IO block 101, digital processing block 103, audio block 106, subwoofer amp/power supply 108, and deflection block 110. Subwoofer amp/power supply 108 is operative to amplify the subwoofer audio signals provided from audio block 106, and provide the amplified subwoofer audio signals to subwoofer 109. Subwoofer amp/power supply 108 also outputs a voltage signal to subwoofer 109, which serves as its power supply. Subwoofer 109 is operative to aurally output the amplified subwoofer audio signals provided from subwoofer amp/power supply 108.

Deflection block 110 is operative to control deflection functions of apparatus 100. According to an exemplary embodiment, deflection block 110 outputs deflection control signals to yokes 115 to 117, which control horizontal and vertical deflection of the high-intensity beams generated by CRTs 112 to 114, respectively. Deflection block 110 is also operative to output color control signals to CRTs 112 to 114 responsive to the processed video signals and other control signals provided from digital processing block 103. As will be explained later herein, the circuitry of deflection block 110 controls one or more display parameters of apparatus 100 responsive to digital processing block 103 detecting the activation and/or de-activation of a browser feature. Also according to an exemplary embodiment, deflection block 110 is operative to output voltage signals to convergence block 111 and CRTs 112 to 114 for their power supplies.

Convergence block 111 is operative to control convergence functions of apparatus 100. According to an exemplary embodiment, convergence block 111 outputs convergence control signals to yokes 115 to 117, as indicated in FIG. 1, which control a positive convergence adjustment for precisely focusing the high-intensity beams emitted from CRTs 112 to 114 on a screen (not shown).

CRTs 112 to 114 are operative to generate high-intensity red, green and blue beams, respectively, for display on a screen responsive to the color control signals from deflection block 110. Yokes 115 to 117 are operative to control CRTs 112 to 114, respectively, responsive to the deflection control signals from deflection block 110 and the convergence control signals from convergence block 111.

Figure 2:
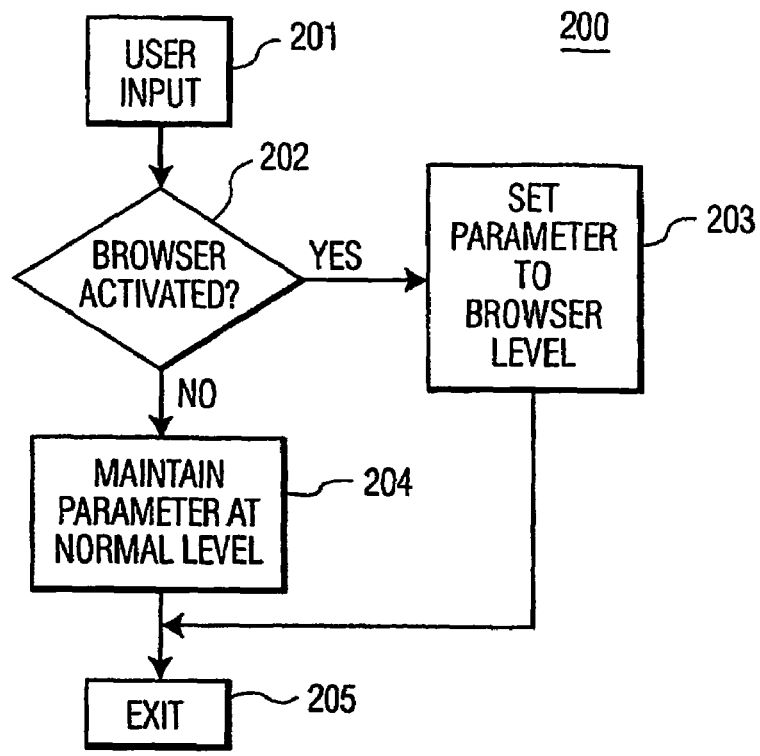
FIG. 2 is a flowchart illustrating exemplary steps according to one aspect of the present invention.

Turning now to FIG. 2, a flowchart 200 illustrating exemplary steps according to one aspect of the present invention is shown. In particular, FIG. 2 represents exemplary steps for changing the level of a display parameter of an apparatus from a predetermined normal level, or a user selected level, to a predetermined browser level when a browser feature of the apparatus is activated. For purposes of example and explanation, the steps of FIG. 2 will be described with reference to apparatus 100 of FIG. 1. Accordingly, the steps of FIG. 2 are merely exemplary, and are not intended to limit the present invention in any manner.

At step 201, a user input to apparatus 100 is detected. According to an exemplary embodiment, the user input to apparatus 100 is provided via an input device such as an IR hand-held remote control, keyboard, or the like. FPA 104 detects the user input and outputs a corresponding signal indicative of the input to IR preamp 105, which amplifies the signal for output to digital processing block 103.

At step 202, a determination is made as to whether the user input at step 201 represents a command to activate the browser feature of apparatus 100. As previously indicated herein, digital processing block 103 is operative to detect activation of the browser feature of apparatus 100. Accordingly, at step 202, digital processing block 103 examines the signal provided from IR preamp 105 to determine whether the user input represents a command to activate the browser feature of apparatus 100.

If the determination at step 202 is positive, process flow advances to step 203 where a display parameter for apparatus 100 is set to a predetermined level, which may be referred to herein as the browser level. As used herein, the term "display parameter" refers to a parameter such as contrast, brightness, color level, sharpness, tint or other display parameter, which may affect screen aging. In order to set the display parameter, digital processing block 103 outputs a control signal to deflection block 110 indicating that the browser feature is activated. Deflection block 110 responds to this control signal by adjusting one or more of its output signals, and thereby setting the display parameter for apparatus 100 to the predetermined browser level. For example, assuming the display parameter is color level, deflection block 110 adjusts the color control signals output to CRTs 112 to 114 to thereby set the color level for apparatus 100 to the predetermined browser level. Alternatively, the display parameter may be adjusted by adjusting the output signal provided by the processing unit 103 to deflection block 110 to achieve the desired parameter level.

The actual level of a display parameter used as the browser level is a matter of design choice, but should be selected to protect the display device associated with apparatus 100 against the premature aging effects of screen burn. According to one exemplary embodiment, the browser level may be set by the manufacturer of apparatus 100 and not be subject to adjustment by a user. With this embodiment, the specific level of a display parameter designated by the manufacturer as the browser level is always used at step 203. For example, assuming the display parameter is contrast, the contrast level used as the browser level may be fixed at 50% contrast.

According to another exemplary embodiment, the browser level may be subject to adjustment by a user, but may have a maximum value set by the manufacturer. That is, the user may adjust the browser level upwardly and/or downwardly via inputs to apparatus 100, but the actual level of a display parameter used as the browser level is capped at a fixed, maximum value. For example, assuming again that the display parameter is contrast, the browser level may have a maximum value of 50% contrast. According to this latter embodiment, the maximum value for the browser level may for example be set as a relative percentage of the current parameter level set by a user as part of the normal picture control settings of apparatus 100. With contrast for example, if the normal picture control settings of apparatus 100 currently indicate 75% contrast, then the browser level may be capped at a relative percentage of this contrast level. Accordingly, if the relative percentage is 50%, then the browser level for apparatus 100 would be capped at 37.5% (i.e., 50% of 75%) contrast. Of course, other techniques for establishing the browser level may be employed according to the present invention.

Alternatively, when the determination at step 202 is negative, process flow advances to step 204 where the level of the display parameter for apparatus 100 is maintained at its current predetermined level, which may be referred to herein as the normal level. According to an exemplary embodiment, the normal level is the current level of the display parameter that is set by a user as part of the normal picture control settings of apparatus 100.

After both steps 203 and 204, process flow advances to step 205 where the algorithm is exited.

Figure 3:
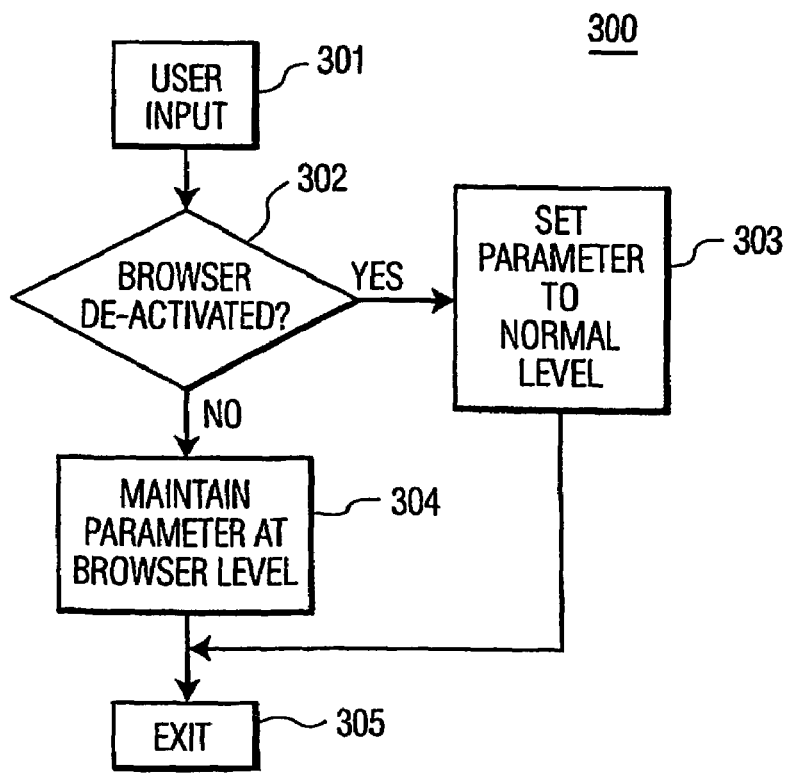
FIG. 3 is a flowchart illustrating exemplary steps according to another aspect of the present invention.

FIG. 3 is a flowchart 300 illustrating exemplary steps according to another aspect of the present invention. In particular, FIG. 3 represents exemplary steps for changing the level of a display parameter of an apparatus from the browser level to the normal level when the browser feature of the apparatus is de-activated. Like FIG. 2, the steps of FIG. 3 will also be described with reference to apparatus 100 of FIG. 1, and are not intended to limit the present invention in any manner.

At step 301, a user input to apparatus 100 is detected. According to an exemplary embodiment, the user input to apparatus 100 is provided via an input device such as an IR hand-held remote control, keyboard, or the like. FPA 104 detects the user input and outputs a corresponding signal indicative of the input to IR preamp 105, which amplifies the signal for output to digital processing block 103 for detection.

At step 302, a determination is made as to whether the user input at step 301 represents a command to de-activate the browser feature of apparatus 100. As previously indicated herein, digital processing block 103 is operative to detect de-activation of the browser feature of apparatus 100. Accordingly, at step 302, digital processing block 103 examines the signal provided from IR preamp 105 to determine whether the user input represents a command to de-activate the browser feature of apparatus 100.

When the determination at step 302 is positive, process flow advances to step 303 where the level of the display parameter for apparatus 100 is set to the normal level. As previously indicated herein, the display parameter may be contrast, brightness, color level, sharpness, tint or another display parameter, and the normal level is the current level of the display parameter which is set by a user as part of the normal picture control settings of apparatus 100.

According to an exemplary embodiment, digital processing block 103 outputs a control signal to deflection block 110 indicating that the browser feature is de-activated. Deflection block 110 responds to this control signal by adjusting one or more of its output signals, and thereby setting the display parameter for apparatus 100 to the predetermined normal level. For example, assuming the display parameter is color level, deflection block 110 adjusts the color control signals output to CRTs 112 to 114 to thereby set the color level for apparatus 100 to the predetermined normal level.

Alternatively, when the determination at step 302 is negative, process flow advances to step 304 where the level of the display parameter for apparatus 100 is maintained at its current predetermined level, which is the browser level.

After both steps 303 and 304, process flow advances to step 305 where the algorithm is exited.

Figure 4:
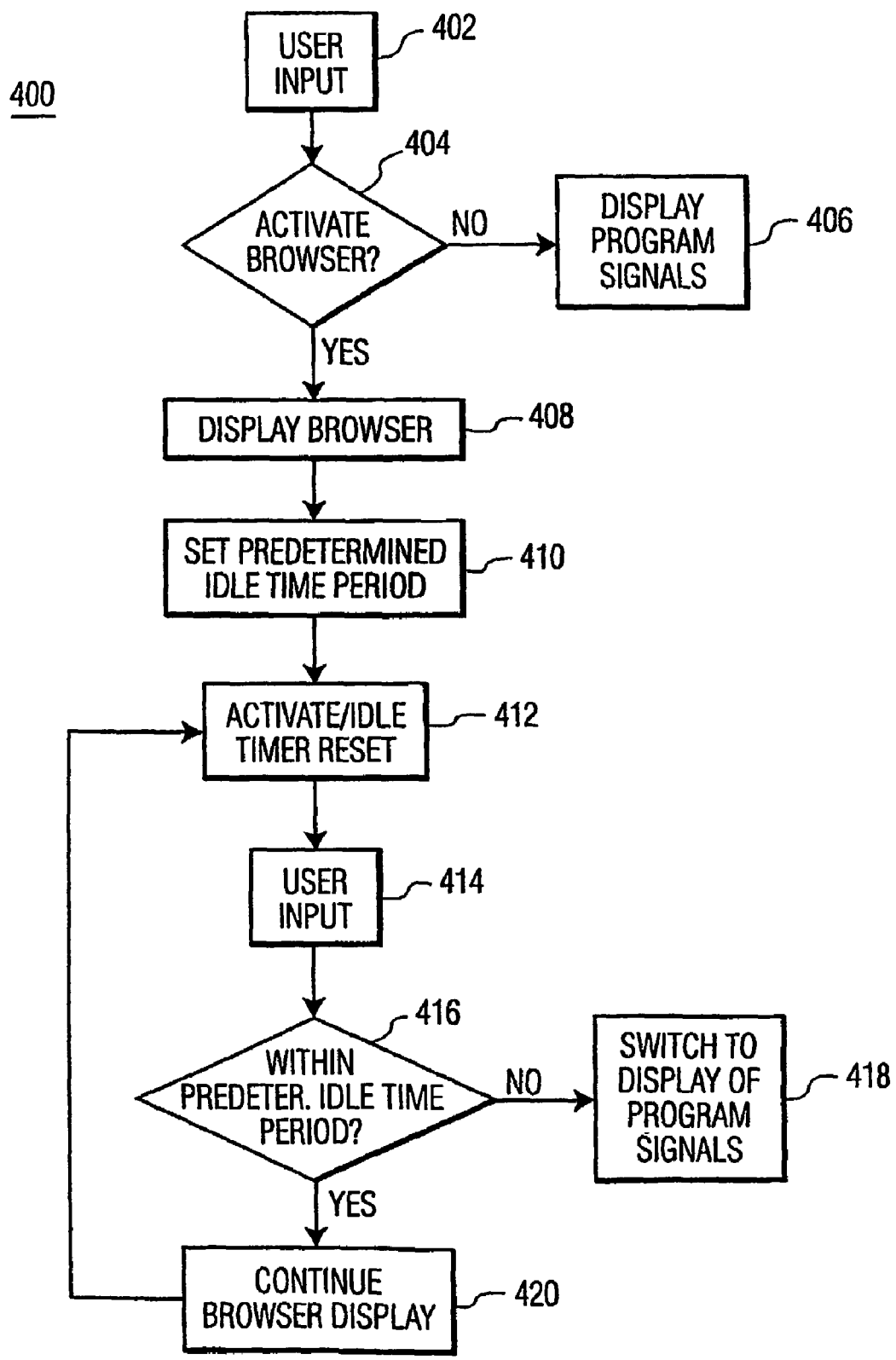
FIG. 4 is a flowchart illustrating exemplary steps according to another aspect of the present invention.

FIG. 4 illustrates steps for exemplary steps according to another aspect of the present invention. According to another aspect, the video apparatus includes an idle timer that determines the period of time that the browser display is idle based on no user inputs being received, and if the idle timer exceeds a predetermined period of time, the browser display is inactivated and the apparatus reverts to display of program signals, i.e., television signals. The predetermined period of time may be set according to the manner in which the browser feature is activated. For example, if the predetermined idle period may be set for one period if the browser is activated by user activation of a dedicated key on a keyboard, and for another period fir the browser is activated by user navigation of an on-screen display. It may be useful to set a longer idle period for the former case than the latter because it is likely that a user activating a browser with a keyboard is likely to be more actively utilizing the browser display.

In step 402, a user input is detected. If the user input is determined to be a browser activation command in step 404, the process continues to step 408 where the processing unit 103 generates the signals for displaying a browser. If not, the process continues at step 406 and display the selected program signal. When the browser feature is activated, the process determines the idle period in step 410. The idle period may be fixed at the time manufacture, be set based on the source of browser activation, as mentioned above, or be set by the user utilizing a set up menu of apparatus 100.

At step 412, the idle timer is activated or is reset, and begins counting. Process 400 then waits for the receipt of the next user input in step 414. When the user input is received, the process determines in step 416 whether the user input was received prior to the expiration of the idle timer period. If so, the process continues the display of the browser in step 420 and returns to reset the idle timer in step 412 and begins counting and waiting for the next user input. If the user input is not received before the expiration of the idle time period, process 400 switches the display to inactivate the browser display and provide program signal display in step 418. Obviously, the process need not wait until a user input is received before switching the displays in step 418. Namely, the process switches the displays as soon as the idle time period expires. In an alternative embodiment, the operation of process 400 may depend upon the type of user input that is received. For example, in step 414, process 400 may be arranged such that the status of the idle timer is checked if the user input is a "browser command" that results in a change in the content of the display. On the other hand, if the user input is a "program viewing command," which may comprise commands that do not change the content of the browser display, process 400 ignores the command and continues the idle timer. In this manner, only those user inputs that result in a change in the content of the display prevents the display from reverting to the program signal display.

As described herein, the present invention advantageously controls one or more display parameters in a video apparatus having a browser feature in order to protect a display device against the premature aging effects of screen burn. While an exemplary embodiment of the present invention has been described wherein a single display parameter is controlled responsive to browser activation and/or de-activation, it is anticipated that a combination of such parameters may also be controlled.

The present invention is particularly applicable to various video signal-processing apparatuses, either with or without a display device. Accordingly, the phrases "video apparatus" or "television signal receiver" as used herein may refer to systems or apparatuses including, but not limited to, television sets, computers or monitors that include a display device, and systems or apparatuses such as set-top boxes, video cassette recorders (VCRs), digital versatile disk (DVD) players, video game boxes, personal video recorders (PVRs), computers or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling a video display, comprising the steps of:
   receiving a program signal from a signal source;
   enabling display of a video program corresponding to the received program signal on a display device, wherein the video program is displayed with a display parameter at a first level;
   activating a browser feature of the video display apparatus in response to a first user input;
   enabling display of a browser on the display device in response to the activation of the browser feature, wherein the browser is displayed with the display parameter at a second level different from the first level, and the display parameter is automatically switched from the first level to the second level in response to the activation of the browser feature.

2. The method of claim 1, further comprising activating a timer for determining an idle time period that no user input is received while the browser feature is activated, and deactivating the browser feature and replacing the browser with the video program on the display device if the idle time period exceeds a predetermined period of time.

3. The method of claim 2, wherein the predetermined period of time is set in response to user input.

4. The method of claim 2, wherein the predetermined period of time is set in response to a source of a browser activation command, wherein the browser activation command from a keyboard results in the predetermined period of time being set to a first period of time, and the browser activation command via an on-screen menu results in the predetermined period of time being set to a second period of time different from the first period of time.

5. The method of claim 2, further comprising a step of distinguishing between browser commands and program viewing commands, wherein receipt of the browser commands resets the activation of the timer for determining the idle time period, and the receipt of the program viewing commands does not reset the activation of the timer.

6. The method of claim 1, wherein the display parameter is one of contrast, brightness, color level, sharpness, and tint.

7. The method of claim 1, wherein the second level represents a lower level than the first level.

8. The method of claim 1, wherein the second level is adjustable in response to a second user input.

9. The method of claim 1, wherein the second level is a predetermined percentage of the first level.

10. A video apparatus, comprising:
    means for receiving a plurality of program signals;
    means for receiving user inputs; and
    means for processing the received program signals and enabling display of video programs corresponding to the received program signals on a display device, the processing means causing the video programs to be displayed with a display parameter at a first level, the processing means enabling display of a browser on the display device in response to user activation of a browser feature, wherein the processing means causes the browser to be displayed with the display parameter at a second level and causes the display parameter to be automatically switched from the first level to the second level in response to the user activation of the browser feature.

11. The video apparatus of claim 10, wherein the processing means activates a timer for determining an idle time period that no user input is received while the browser feature is activated, and deactivates the browser feature and replaces the browser with one of the video programs on the display device if the idle time period exceeds a predetermined period of time.

12. The video apparatus of claim 11, wherein the predetermined period of time is set in response to user input.

13. The video apparatus of claim 11, wherein the predetermined period of time is set in response to a source of a browser activation command, wherein the browser activation command received from activation of a switch on a keyboard results in the predetermined period of time being set to a first period of time, and the browser activation command received via an on-screen menu results in the predetermined period of time being set to a second period of time different from the first period of time.

14. The video apparatus of claim 11, wherein the processing means is adapted to distinguish between browser commands and program viewing commands, wherein receipt of the browser commands resets the activation of the timer for determining the idle time period, and the receipt of the program viewing commands does not reset the activation of the timer.

15. The video apparatus of claim 10, wherein the display parameter is one of contrast, brightness, color level, sharpness, and tint.

16. The video apparatus of claim 10, wherein the second level represents a lower level than the first level.

17. The video apparatus of claim 10, wherein the second level is adjustable in response to a second user input.

18. The video apparatus of claim 10, wherein the second level is a predetermined percentage of the first parameter level.

19. A video apparatus, comprising:

an input for receiving a plurality of program signals; and a processor, coupled to the input, for processing the received program signals and enabling display of video programs corresponding to the received program signals on a display device, the processor causing the video programs to be displayed with a display parameter set to a first level, the processor enabling display of a browser on the display device in response to user activation of a browser feature, wherein the processor causes the browser to be displayed with the display parameter set to a second level and causes the display parameter to be automatically switched from the first level to the second level in response to the user activation of the browser feature.

* * * * *